March 6, 1934.   E. B. ANDERSON   1,950,207

UNIVERSAL JOINT

Filed March 14, 1931

Inventor:
Edmund B Anderson
By Wilson, Dowell,
McCanna & Pehm
Attys.

Patented Mar. 6, 1934

1,950,207

UNITED STATES PATENT OFFICE 1,950,207

UNIVERSAL JOINT

Edmund B. Anderson, Rockford, Ill., assignor to Mechanics Universal Joint Company, Rockford, Ill., a corporation of Illinois Application March 14, 1931, Serial No. 522,580

6 Claims. (Cl. 287—129)

This invention relates to universal joints and contemplates the arrangement of the parts thereof whereby to materially facilitate the assembly of the joint and its cooperating parts.

It is sometimes convenient to provide universal joints wherein one or more of the terminal coupling members consists of two parts, one forming a portion of the joint proper and the other being adapted to be secured to the end of a driving or driven shaft. These portions are ordinarily connected together by means of abutting flanges on the two portions, the flanges being formed at right angles to the longitudinal axis of the part. Since it is desirable to make the overall length of the joint as small as conveniently possible, it is necessary to place this flange connection in close proximity to the transmission member of the joint. As a result of this, the flanges must be of sufficient diameter to permit the flange securing bolts to be inserted in the flange without undue interference either from the transmission member or the shaft. However, in spite of this, it has been necessary, in the past, to employ open end and ratchet wrenches for inserting these bolts because of hitherto unavoidable interference from the transmission member and the shaft to the use of high speed socket wrenches. Furthermore, the large diameter of the flanges is undesirable both because of the increased weight of the joint and the greater cost of manufacture.

I have, therefore, aimed to provide a universal joint wherein the flange bolts may be inserted by means of a speed wrench and wherein the diameter and over-all length of the flange joint is materially reduced.

Another object of the invention is the provision of pilot means for coaxially positioning the portions of a terminal coupling member.

Other objects and attendant advantages will become apparent to those skilled in the art from the following description and the accompanying drawing in which—

Figure 1:
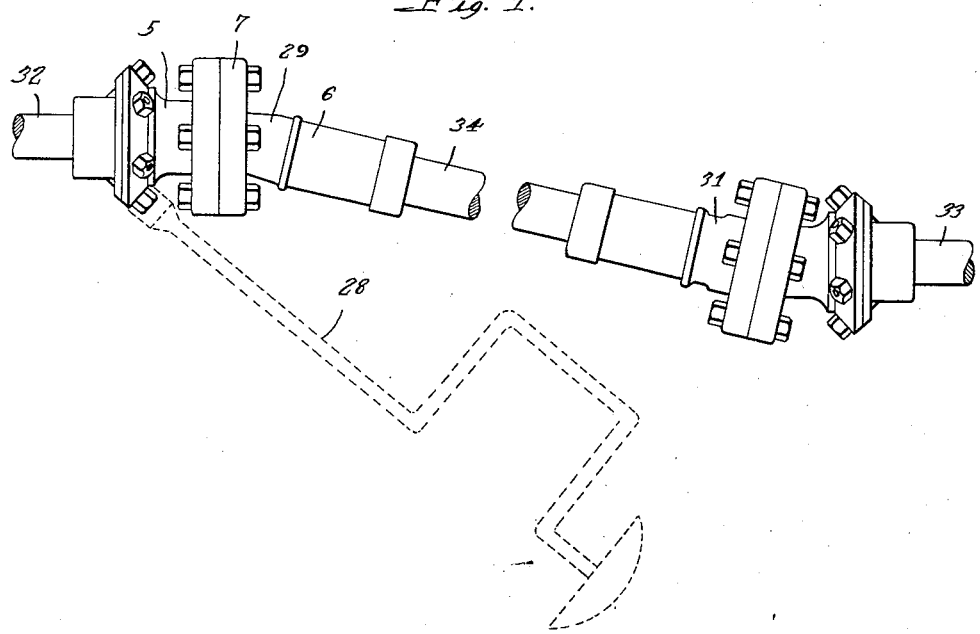
Figure 2:
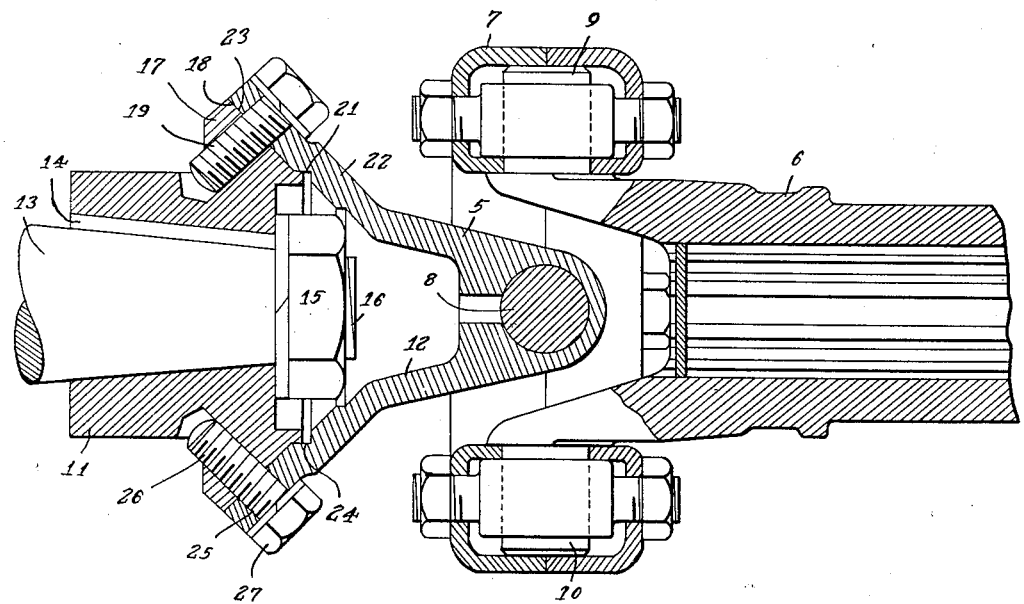

Figure 1 is a side elevation of a universal joint assembly showing the manner in which my improved construction permits the use of highspeed assembling tools; and Fig. 2 is a vertical section through a universal joint embodying my improved construction.

The present invention will be readily understood without a detailed description of the construction and advantages of the particular universal joint shown in the drawing since in its broader aspect the invention is adapted to be employed with joints widely differing in their mechanical construction. It will suffice to say that the joint shown consists of terminal coupling members 5 and 6 and an intermediate transmission ring 7, the coupling member 5 being rotatably supported upon a cross-pin 8 on the member 7, and the coupling member 6 being rotatably supported on the coupling member 7 by means of trunnions 9 and 10.

Directing attention now to the structural features of the present invention, at least one of the terminal coupling members 5 and 6, in this particular instance the member 5, consists of a connector portion 11 and a yoke portion 12. The connector portion 11 is adapted to be fixedly secured to a shaft 13 by means of a key 14 and a nut 15 on the threaded end 16 of the shaft 13. The inner end of the portion 11 is provided with a circumferential flange 17 having a flange face 18 at an acute angle with respect to the longitudinal center line of the portion 11 to form a conelike structure. Threaded openings 19 extend through the flange face 18 at right angles thereto and extend through the flange 17 into the body of the portion 11. The inner end of the flange face 18 is provided with a face 21 parallel to the longitudinal axis of the portion 11, the function of which will presently be set forth.

The yoke 12 is rotatably supported upon the cross-pin 8 in the usual manner and is provided with a conical flange 22 having an internal flange face 23, the flange face 23 having the same angle with respect to the longitudinal center line of the terminal coupling member 5 as the flange face 18. The flange faces 18 and 23 are adapted to be brought into abutting relation, the end of the shaft 13 and the inner end of the portion 11 normally resting within the conical flange 22. The flange 23 is provided at its inner edge with a longitudinal face 24 parallel to the longitudinal center line of the coupling member and complemental to the face 21 on the portion 11. The flange 22 is provided with bolt openings 25 registering with the openings 19 in the flange 17 to receive stud bolts 26 having heads 27.

The operation of the device is relatively simple. The flange faces 18 and 23 are adapted to be brought into abutting relation and firmly secured together by means of the bolts 26. The bolts thus serve to bring these two faces together and to prevent rotation of the connector portion 11 with respect to the yoke 12. The complemental faces 21 and 24 serve as a pilot in assembling to positively position the portions 11 and 12 in coaxial alignment. A further function of the complemental faces 21 and 24 is to positively prevent lateral movement between the portions 11 and 12 during the operation of the joint and remove all lateral strain from the bolts 26.

Referring now more particularly to Figure 1, it will be seen that because of the angularity of the flanged faces the bolts 26 may be positioned at an angle with respect to the longitudinal center line of the connector member and yet pass through the flanges 22 and 17 at right angles to the flange faces 18 and 23. This angularity of the bolts 26 permits a high-speed socket wrench such as indicated in doted lines and designated by the numeral 28 to be used without interference from either the transmission member 7 or the shafts. Furthermore, it will be seen that the flanges 22 and 17 need only be made of sufficient diameter to perform their function in holding the two portions of the connector member together, since the socket wrench 28 will engage the heads 27 of the bolts 26 at an angle with respect to the shaft. In this figure, I have shown a common type of assembly wherein two universal joints designated generally by the numerals 29 and 31 are employed, fixedly connected to shafts 32 and 33, either of which may be the driving shaft and splined to an intermediate propeller shaft designated generally by 34. The shaft 13 of Fig. 2 may correspond to either the shaft 32 or 33 of Fig. 1, the benefits and advantages being the same, in each case.

The advantages of my improved construction lie principally in the increased facility with which the flange of a universal joint may be assembled, the decreased length of the joint, and the decreased cost of manufacturing and assembling the joint. Because of my improved construction the flange may be asembled in about one-third the time required for assembling the joint with an open end or ratchet wrench. Furthermore, as a result of my invention a greater clearance is had between the companion flanges and the transmission member thereby permitting the transmission member to be bolted together with greater facility and reducing the strain on the transmission or other bearing supporting the shaft 13. Furthermore, the diameter of the flange is reduced. In one particular instance it permitted the diameter of the flange to be reduced from a 3⅞ inches to about 3 inches, thereby materially reducing the weight of the joint and the cost of the metal employed in its manufacture.

While I have thus described and illustrated a specific embodiment of my invention I am aware that numerous alterations and changes may be made therein without materially departing from the spirit of the invention and the scope of the appended claims in which—

I claim:

1. In a universal joint, a connector member adapted to be secured to a rotatable shaft, said member having a flange face at an acute angle with respect to the axis of rotation thereof, a coupling member situated closely adjacent to a larger member and provided with a flange face complementary to said first mentioned face, and a plurality of bolts in said flanges, the angle of said flanges with respect to the longitudinal axis being such that the longitudinal center lines of said bolts do not intersect said larger member whereby a high-speed tool may be employed on said bolts to assemble said joint.

2. A universal joint comprising a pair of coupling members and an intermediate transmission member, at least one of said coupling members comprising a connector portion adapted to be secured to a rotatable shaft and having a flange face at an angle of less than 90° with respect to the longitudinal center of said connector member, a yoke having a flange in close proximity to said transmission member engageable with the flange of said connector portion, and a plurality of bolts for securing said flange together, the angle of said flanges being such as to increase the space between said flanges and said transmission member for angular displacement of the latter and to permit said bolts to be inserted with a speed wrench.

3. A universal joint comprising a pair of coupling members and an intermediate transmission member, at least one of said coupling members comprising a connector portion, a yoke portion and a plurality of bolts for securing them together, one of said portions having a flange at an angle of about 45° with respect to its longitudinal center and the other having a complemental flange in close proximity to said transmission member, said bolts passing therethrough at an angle with respect to the center whereby to provide clearance for use of a high-speed wrench on said bolts.

4. A universal joint comprising a pair of terminal coupling members and an intermediate transmission member, at least one of said coupling members comprising a connector portion having a conical face concentric with the longitudinal axis thereof, a yoke having a socket receiving said conical face, and a plurality of stud bolts through said conical face and said socket at right angles to said face for securing said portions together.

5. A universal joint comprising a pair of terminal coupling members and an intermediate transmission member, at least one of said coupling members comprising a connector and a yoke having complemental flanges arranged to form a flange union at an angle other than 90° with respect to the longitudinal center, and a plurality of bolts arranged to secure said flanges together, said bolts being positioned with their heads in the larger angle whereby to provide room between the angle of the bolts and the joint for the use of a speed wrench in assembling.

6. A flange coupling for connecting two objects at a point closely adjacent to a larger structure comprising a coupling member on one of said objects having an acute flange, a second coupling member connected to the second object having a complementary obtuse flange, and at least one screw threaded connecting member between said flanges substantially at right angles thereto, the angularity of said flanges being such that a speed wrench may be used without interference from said objects or said structure.

EDMUND B. ANDERSON.